(12) United States Patent
Timsjo et al.

(10) Patent No.: US 9,552,616 B2
(45) Date of Patent: Jan. 24, 2017

(54) USING OPC UA TO AUTOMATICALLY GENERATE PROCESS GRAPHICS

(71) Applicant: ABB Research Ltd., Zurich (CH)

(72) Inventors: Susanne Timsjo, Vasteras (SE); Martin Olausson, Vasteras (SE); Anders Hanberg, Vasteras (SE)

(73) Assignee: ABB Research Ltd., Zurich (CH)

( * ) Notice: Subject to any disclaimer, the term of this patent is extended or adjusted under 35 U.S.C. 154(b) by 86 days.

(21) Appl. No.: 14/084,078

(22) Filed: Nov. 19, 2013

(65) Prior Publication Data

US 2014/0078162 A1    Mar. 20, 2014

Related U.S. Application Data

(63) Continuation of application No. PCT/EP2011/058855, filed on May 30, 2011.

(51) Int. Cl.
*G06T 1/00* (2006.01)
*G05B 19/042* (2006.01)

(52) U.S. Cl.
CPC .............. *G06T 1/00* (2013.01); *G05B 19/042* (2013.01); *G05B 2219/31472* (2013.01)

(58) Field of Classification Search
None
See application file for complete search history.

(56) References Cited

U.S. PATENT DOCUMENTS 6,282,699 B1 * 8/2001 Zhang et al. ................. 717/109
6,594,599 B1 * 7/2003 Kent ................ G01R 31/31728
                                                    702/84
2003/0009253 A1 * 1/2003 McIntyre ........... G05B 23/0216
                                                    700/108
2003/0105535 A1   6/2003 Rammler
2003/0144751 A1 * 7/2003 Chandhoke et al. ........... 700/61
2004/0034498 A1 * 2/2004 Shah .................. G01R 19/2516
                                                    702/127

(Continued)

FOREIGN PATENT DOCUMENTS

WO    2009046095 A1    4/2009

OTHER PUBLICATIONS

Hans-Petter Halvorsen, OPC and Real-Time Systems in Labview, 2010, Tutorial, Telemark University College, Porsgrunn, Norway.*

(Continued)

*Primary Examiner* — Michael J Cobb
(74) *Attorney, Agent, or Firm* — Whitmyer IP Group LLC

(57) ABSTRACT

A method and device for generating a set of graphical objects to be displayed by using OPC UA (Unified Architecture) specification. The method includes indicating, by using OPC UA nodes, graphical objects to be displayed, the graphical objects representing physical components of a monitored process. Further, the method includes indicating, by using OPC UA references, how an indicated graphical object should be interconnected to another indicated graphical object when displayed. Next, the respective OPC UA node is associated with a corresponding predetermined graphical object, the set of graphical objects is generated from the associations and the individual graphical objects of the set is interconnected in accordance with the indicated interconnections. Finally, the generated set of graphical objects is displayed.

18 Claims, 2 Drawing Sheets

(56) References Cited

U.S. PATENT DOCUMENTS

| | | | |
|---|---|---|---|
| 2004/0255269 A1* | 12/2004 | Santori | G06F 8/38 717/109 |
| 2006/0224802 A1 | 10/2006 | Ida | |
| 2008/0270920 A1* | 10/2008 | Hudson | 715/763 |
| 2008/0307331 A1 | 12/2008 | Kuwatani | |
| 2009/0210814 A1* | 8/2009 | Agrusa et al. | 715/772 |
| 2010/0211197 A1* | 8/2010 | Balentine | G05B 19/0426 700/87 |
| 2010/0306313 A1* | 12/2010 | Mahnke | G06F 9/543 709/203 |
| 2011/0022975 A1* | 1/2011 | Kodaganur et al. | 715/765 |
| 2011/0202887 A1* | 8/2011 | Mendez et al. | 715/853 |

OTHER PUBLICATIONS

PLCOpen, PLCopen and OPC Foundation: OPC UA Information Model for IEC 61131-3, 2010, Technical specification version 1.0, published by OPC Foundation and PLCopen.*

Miriam Schleipen, OPC UA Supporting the Automated Engineering of Production Monitoring and Control Systems, 2008, 13th Annual IEEE International Conference on Emerging Technologies and Factory Automation, pp. 640-647.*

Miriam Schleipen, Rainer Drath, Olaf Sauer, The System-Independent Data Exchange Format CAEX for Supporting an Automatic Configuration of a Production Monitoring and Control System, 2008, IEEE International Symposium on Industrial Electronics, ISIE, pp. 1786-1791.*

VTT-TEC-ADA-02, Overview of Meta Model Definition in XML for EXPRESS Representation, 2001, SECOM Co., Ltd. / VTT Building and Transport, retrieved from <<http://cic.vtt.fi/projects/ifcsvr/tec/VTT-TEC-ADA-02.pdf>>, accessed Feb. 3, 2016.*

Fraunhofer IOSB, Provis.Visu, 2016, retrieved from <<http://www.iosb.fraunhofer.de/servlet/is/35793/>>, accessed Feb. 22, 2016.*

Oracle, Oracle Scripting User Guide Release 12.1, 2010, retrieved from <<https://docs.oracle.com/cd/E18727_01/doc.121/e13593/T219921T450516.htm>>, accessed Feb. 22, 2016.*

Miriam Schleipen (2010). "Automated Production Monitoring and Control System Engineering by Combining a Standardized Data Format (CAEX) with Standardized Communication (OPC UA)"; pp. 501-522.

Postal, et al.; "Implementation of the OPC UA Information Model for Analyzers"; OPC Foundation Inc 2009; pp. 1-11.

International Preliminary Report on Patentability Application No. PCT/EP2011/058855 Completed: Jul. 31, 2013 12 pages.

International Search Report and Written Opinion of the International Searching Authority Application No. PCT/EP2011/058855 Completed: Mar. 2, 2012; Mailing Date: Apr. 12, 2012 9 pages.

Wolfgang Mahnke, et al. "OPC Unified Architecture" Mar. 19, 2009; Springer-Verlag, Berlin Heidelberg; pp. 1 58, and 311-322.

Written Opinion of the International Preliminary Examining Authority Application No. PCT/EP2011/058855 Mailing Date: May 17, 2013 5 pages.

* cited by examiner

USING OPC UA TO AUTOMATICALLY GENERATE PROCESS GRAPHICS

FIELD OF THE INVENTION

The present invention generally relates to a method and device for generating a set of graphical objects to be displayed by using OPC UA specification.

BACKGROUND OF THE INVENTION

OPC Unified Architecture (OPC UA) is a platform independent protocol which specifies how to exchange data between different systems, software applications and hardware devices. OPC UA enables exchange of data between software applications independently of the application's vendor, supported operating system, and used programming language.

In the process industry today, process graphics are typically built using a graphic builder, for example the ABB system 800xA includes a graphic builder, and so do most systems in this particular field. These graphic builders facilitate building of process graphics as they assist the users in building the graphic representation of a real object using predetermined graphic building blocks. A graphic builder also assists the user connecting graphic objects to the process' real time data, often provided via OPC. A graphic object does not need to be dynamic; it can be static to serve as a generic building block to be used in other graphics. The generated graphic objects can also contain built in functionality for process control, navigation and indication of invalid data. The graphic objects may also visualize for example if data exceeds specified high or low limits.

A problem with conventional graphic builders is that a great deal of programming effort is required from a developer in order to create graphical objects, and in particular when trying define a complete environment of graphical objects for a certain industrial process. Further, a set of graphical objects created for a particular industrial process cannot necessarily be reused in a different industrial process when targeting different industries, which has the drawback that a great deal of engineering is required.

"OPC Unified Architecture" by Wolfgang Mahnke et al published on Springer-Verlag generally discloses the platform independent OPC UA protocol.

WO 2009/046095 generally discloses systems and methods for gathering, analyzing, formatting and presenting information related to monitored processes and environments, where graphical representations of operational process control data received from servers is displayed within the context of geographical locations at which the processes operate.

SUMMARY OF THE INVENTION

A general object of the present invention is to solve or at least mitigate the above described problems in the art.

In a first aspect of the present invention this object is achieved by a method of generating a set of graphical objects to be displayed by using OPC UA specification. The method comprises indicating, by means of using OPC UA nodes, graphical objects to be displayed, said graphical objects representing physical components of a monitored process. Further, the method comprises indicating, by means of using OPC UA references, how an indicated graphical object should be interconnected to another indicated graphical object when displayed. Next, the respective OPC UA node is associated with a corresponding predetermined graphical object, the set of graphical objects is generated from said associations and the individual graphical objects of the set is interconnected in accordance with the indicated interconnections. Finally, the generated set of graphical objects is displayed.

In a second aspect of the present invention this object is achieved by a device for generating a set of graphical objects to be displayed by using OPC UA specification. The device is arranged to receive source code indicating, by means of using OPC UA nodes, graphical objects to be displayed. The graphical objects represent physical components of a monitored process. The source code further indicates, by means of using OPC UA references, how an indicated graphical object should be interconnected to another indicated graphical object when displayed. The device is further arranged to associate the respective OPC UA node with a corresponding predetermined graphical object, generate the set of graphical objects from said associations, interconnecting the individual graphical objects in the set in accordance with the indicated interconnections and providing the generated set of graphical objects for display.

Thus, capabilities of OPC UA are used to generate graphical objects from combinations of established and predefined OPC UA terminology. The need for prior art graphic builders is thus reduced.

OPC UA presents an object oriented protocol to represent controller data. The base modeling concepts in OPC UA are nodes and references. Every node is described with attributes like for example, id, name, description, value. To automatically generate graphical objects to be displayed on a screen, the implementation of the OPC UA protocol is browsed and interpreted.

Additional features and advantages will be disclosed in the following.

BRIEF DESCRIPTION OF THE DRAWINGS

Embodiments of the present invention and advantages thereof will now be described by way of non-limiting examples, with reference to the accompanying drawings, where.

DETAILED DESCRIPTION OF THE INVENTION

Figure 1:
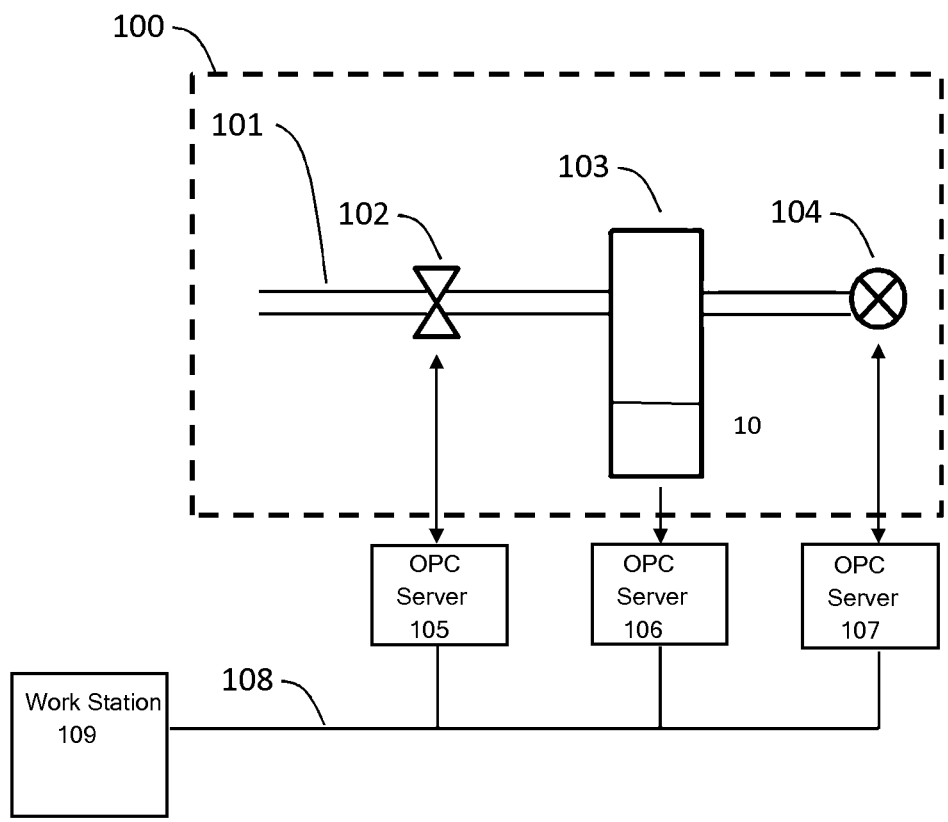
FIG. 1 illustrates an industrial process to be monitored in an embodiment of the present invention.

FIG. 1 illustrates an industrial process 100 to be monitored in accordance with an embodiment of the invention. This industrial process is exemplified in the form of a pipe 101 leading liquid, for instance gasoline, to a valve 102. The valve determines how much if any of the gasoline should be delivered to a tank 103 via the pipe 101. In this particular example, the level of gasoline in the tank is 10 units. From the tank, the gasoline is supplied to a motor 104. It should be noted that this example is greatly exemplified and in real-life, an industrial process to be monitored is typically considerably more complex.

Now, to be able to monitor the industrial process 100 by using OPC UA, the components of the process is connected to a respective OPC server 105, 106, 107 for collecting OPC data from the components 102, 103, 104. In case the components permit external control, OPC data to control the components can be sent to the respective OPC server. For instance, OPS server 105 may collect data relating to flow of gasoline through the valve 102, but may also allow control of the flow through the valve by means of using OPC data for the control such that the level of gasoline in the tank 103 can be regulated. In this particular example, the tank 103 is a relatively passive process component, which does not offer any property control, but which delivers data pertaining to the gasoline level to the OPC server 106. Finally, the OPC server 107 collects data from the motor 104 regarding motor speed. Further, the motor speed can be regulated by the OPC server 107 when appropriate OPC data is supplied.

The OPC servers are typically connected to a bus 108 for delivering measured process data to, and receiving process control data from, an operator work station 109.

In order for an operator to be able to monitor the industrial process at his or her work station 109, a graphical representation of the industrial process must be provided. This graphical representation would typically look very similar to the industrial process 100 as it is depicted in FIG. 1.

In OPC UA, terminology has been established where physical objects can be defined by means of objects, attributes, structures, etc. The set of information that an OPC UA Server makes visible to its clients, such as the work station 109, is referred to as AddressSpace. The OPC UA AddressSpace represents its contents as a set of Nodes connected by References. This is well-known terminology in the art and will not be explained in any further detail. Nodes in the AddressSpace are used to represent real objects, for instance pipe 101, valve 102, tank 103 and motor 104 of FIG. 1.

In an embodiment of the present invention, graphical representation of an industrial process is attained by utilizing the feature in OPC UA that an object oriented protocol is used to represent OPC server data. The base modeling concepts in OPC UA are the above mentioned nodes and references. Every node is described with attributes like for example id, name, description, value, etc. To automatically generate graphical objects to be displayed on a screen, the implementation of the OPC UA protocol is browsed and interpreted.

Thus, a node type can be related to a graphic representation. In an exemplifying embodiment, one node can for instance represent the valve 102 of FIG. 1, while another node can represent the tank 103 and still a further node can represent the motor 104.

A set of graphical objects is created and stored in a graphical "library". To create a graphical representation of the industrial process exemplified in FIG. 1, four nodes would have to be used ("pipe", "valve", "tank" and "motor"), and the corresponding graphical objects would have to be created. Once this is done, any operator can easily use the established OPC UA terminology to make her own graphical representations of any industrial process. Further, the created graphical objects can be reused and distributed to other operators.

For instance, the operator (or any other person wishing to create the process graphics), can enter the node types in a script, and thus indicate which graphical objects she intends to include in a graphical representation.

Thereafter, the operator can indicate how the different nodes should be interconnected. To this end, the already established OPC UA concept of References could be used. Again, this could be entered in the script in an appropriate manner to indicate how a graphical object indicated by the above node types should be interconnected to any other indicated node type.

Then, the script is computer-interpreted such that each indicated OPC UA node of the script is associated with a respective one of the created graphical objects stored in library. Hence, each indicated node is associated with a corresponding graphical object. This interpretation is typically embodied by making a compilation of the source code of the script. Further, in the computer interpretation, a set of graphical objects representing the physical components of the monitored industrial process is generated. To this end, the associations of the OPC UA node with the graphical objects is utilized, and the indicated references will determine how each graphical object should be connected to another indicated graphical object. Thus, in this example, the valve 102 can be defined as an input element to the tank 103 while the motor 104 can be defined as an output element. Finally, the generated set of graphical objects is displayed.

Figure 2:
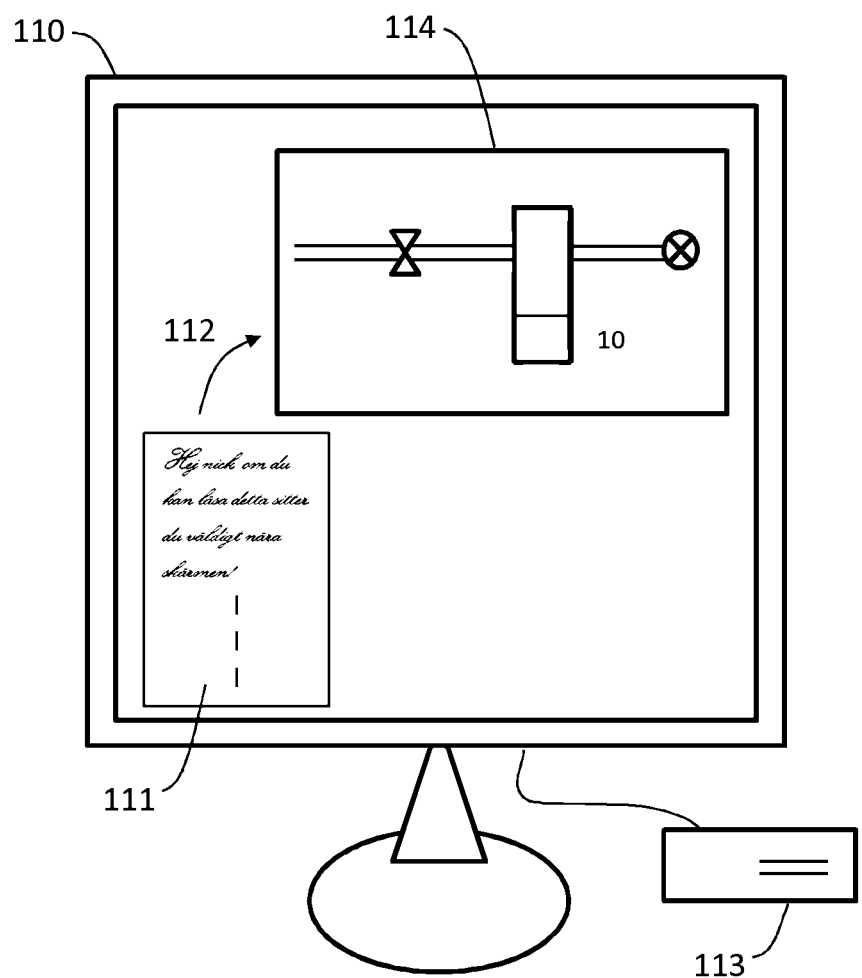
FIG. 2 illustrates the process of creating graphical objects of the industrial process depicted in FIG. 1 according to an embodiment of the invention.

FIG. 2 illustrates the process of creating graphical objects of the industrial process depicted in FIG. 1 according to an embodiment of the invention. The work station 109 of FIG. 1 is realized by means of a computer screen 110 at which the operator typically is located when supervising the industrial process 100 in FIG. 1, and a computer 113. As previously has been described, the operator enters appropriate OPC UA terms in a script 111 by means of a keyboard (not shown) to define the process to be graphically illustrated. In an embodiment of the invention, this is done by using the concept of OPC UA nodes and references.

Then, the operator pushes a "compile" button, wherein the text, or source code, entered in the script is compiled (i.e. computer-interpreted) in step 112 such that each indicated OPC UA node of the script is associated with a respective one of the created graphical objects stored in library. Hence, each indicated node is associated with a corresponding graphical object. Thereafter, when the computer 113 has finished the compilation, a set of graphical objects 114 representing the physical components of the monitored industrial process is generated and displayed.

In a further embodiment of the present invention, the concept of Attributes supported by OPC UA is employed. For example, with reference to FIG. 1, a node corresponding to the tank 103 could provide a read-type attribute such that the actual level of the tank could be read at the OPC server 106 and presented to the operator on the generated graphical representation of the industrial process 100 at the work station 109.

In a further embodiment, it is possible to assign a write-type attribute to a node. With reference to FIG. 1, it would be desirable to control the flow through the valve 102 to attain a desired level of gasoline in the tank 103. This could be done by providing the valve node with a write-type attribute such that an appropriate control signal is communicated to the valve 102 via OPC server 105 to set the tank level at a desired level.

The skilled person in the art realizes that the present invention by no means is limited to the examples described hereinabove. On the contrary, many modifications and variations are possible within the scope of the appended claims.

What is claimed is:

1. A device for providing a graphical representation of an industrial process to be monitored using OPC UA (Unified Architecture), the device being arranged to:
   store a library of graphical objects on non-transitory computer-readable media that represent physical components of the industrial process;
   create a user generated script specifying OPC UA nodes to be included in the graphical representation, with each OPC UA node in the script representing a different physical component of the industrial process, the script also having OPC UA references indicating how graphical objects should be interconnected to one another when displayed;

compile text entered into the script to automatically generate a set of graphical objects from the stored library by associating each OPC UA node in the script with a corresponding graphical object in the stored library, OPC UA references in the script determining how each graphical object in the generated set of graphical objects is interconnected to another graphical object in the generated set of graphical objects;

display the generated set of graphical objects on a display, said set of graphical objects representing physical components being monitored in the industrial process, each of the generated set of graphical objects connected to one or more OPC servers handling OPC data for the represented physical component; and assign a data value to at least one of the displayed graphical objects, wherein the assigned data value is of a write-type indicating that the assigned data value is sent to the physical component corresponding to said at least one displayed graphical object for controlling a property of the physical component stipulated by a first OPC UA attribute.

2. The device according to claim 1, wherein the device is further arranged to assign a second data value to a different one of the at least one of the displayed graphical objects, wherein the assigned second data value is of a read-type indicating that the assigned second data value is to be read from the physical component, the second data value corresponds to a property stipulated by a second OPC UA attribute.

3. The device according to claim 2, wherein the first OPC UA attribute and the second OPC UA attribute are different OPC UA attributes.

4. The device according to claim 1, further comprising: a text editing device in which the script can be entered.

5. The device according to claim 1, wherein an object oriented protocol of OPC UA is used to represent OPC server data.

6. The device according to claim 1, wherein the library of graphical objects is distributed for reuse with another industrial process.

7. A computer program on non-transitory computer readable media for providing a graphical representation of an industrial process to be monitored using OPC UA (Unified Architecture), comprising code for computer interpretation of a script for carrying out a method when run on a computer, comprising the steps of:

storing a library of graphical objects representing physical components of the industrial process;

creating a user generated script specifying OPC UA nodes to be included in the graphical representation, with each OPC UA node in the script representing a different physical component of the industrial process, the script also having OPC UA references indicating how graphical objects should be interconnected to one another when displayed;

compiling text entered into the script to automatically generate a set of graphical objects from the stored library by associating each OPC UA node in the script with a corresponding graphical object in the stored library, OPC UA references in the script determining how each graphical object in the generated set of graphical objects is interconnected to another graphical object in the generated set of graphical objects;

displaying the generated set of graphical objects on a display, said set of graphical objects representing physical components being monitored in the industrial process, each of the generated set of graphical objects connected to one or more OPC servers handling OPC data for the represented physical component; and receiving user input for assigning a data value to at least one of the displayed graphical objects, wherein the assigned data value is of a write-type indicating that the assigned data value is sent to the physical component corresponding to said at least one displayed graphical object for controlling a property of the physical component stipulated by a first OPC UA attribute.

8. The computer program according to claim 7, further arranged to assign a second data value to a different one of the at least one of the displayed graphical objects, wherein the assigned second data value is of a read-type indicating that the assigned second data value is to be read from the physical component, the second data value corresponds to a property stipulated by a second OPC UA attribute.

9. The computer program according to claim 8, wherein the first OPC UA attribute and the second OPC UA attribute are different OPC UA attributes.

10. The computer program according to claim 7, further comprising a text editing device in which the script can be entered.

11. The computer program according to claim 7, wherein an object oriented protocol of OPC UA is used to represent OPC server data.

12. The computer program according to claim 7, wherein the library of graphical objects is distributed for reuse with another industrial process.

13. A method for providing a graphical representation of an industrial process to be monitored using OPC UA (Unified Architecture), the method comprising:

creating a library of graphical objects representing physical components of the industrial process and storing the library on non-transitory computer-readable media;

creating a user generated script specifying OPC UA nodes to be included in the graphical representation, with each OPC UA node in the script representing a different physical component of the industrial process, the script also having OPC UA references indicating how graphical objects should be interconnected to one another when displayed;

compiling text entered into the script with a computer to automatically generate a set of graphical objects from the stored library by associating each OPC UA node in the script with a corresponding graphical object in the stored library, OPC UA references in the script determining how each graphical object in the generated set of graphical objects is interconnected to another graphical object in the generated set of graphical objects;

displaying the generated set of graphical objects on a display, said set of graphical objects representing physical components being monitored in the industrial process, each of the generated set of graphical objects connected to one or more OPC servers handling OPC data for the represented physical component; and receiving user input for assigning a data value to at least one of the displayed graphical objects, wherein the assigned data value is of a write-type indicating that the assigned data value is sent to the physical component corresponding to said at least one displayed graphical object for controlling a property of the physical component stipulated by a first OPC UA attribute.

14. The method according to claim 13, further comprising assigning a second data value to a different one of the at least one of the displayed graphical objects, wherein the assigned second data value is of a read-type indicating that the assigned second data value is to be read from the physical component, the second data value corresponds to a property stipulated by a second OPC UA attribute.

15. The method according to claim 14, wherein the first OPC UA attribute and the second OPC UA attribute are different OPC UA attributes.

16. The method according to claim 13, wherein an object oriented protocol of OPC UA is used to represent OPC server data.

17. The method according to claim 13, further comprising a text editing device in which the script can be entered.

18. The method according to claim 13, wherein the library of graphical objects is distributed for reuse with another industrial process.

* * * * *